United States Patent
Beaudoin et al.

(10) Patent No.: US 11,562,467 B2
(45) Date of Patent: Jan. 24, 2023

(54) METHOD AND SYSTEM FOR DESIGNING AN OPTICAL FILTER

(71) Applicant: ELEMENT AI Inc., Montreal (CA)

(72) Inventors: Philippe Beaudoin, Montreal (CA); Sherif Elsayed-Ali, Montreal (CA)

(73) Assignee: ServiceNow Canada Inc., Montreal (CA)

(*) Notice: Subject to any disclaimer, the term of this patent is extended or adjusted under 35 U.S.C. 154(b) by 339 days.

(21) Appl. No.: 17/007,789

(22) Filed: Aug. 31, 2020

(65) Prior Publication Data

US 2022/0067884 A1 Mar. 3, 2022

(51) Int. Cl.
*G06T 5/00* (2006.01)
*G06N 3/08* (2006.01)
*G06T 5/50* (2006.01)
*G06N 20/00* (2019.01)
(Continued)

(52) U.S. Cl.
CPC ............. *G06T 5/002* (2013.01); *G06N 3/084* (2013.01); *G06N 7/005* (2013.01); *G06N 20/00* (2019.01); *G06T 5/50* (2013.01); *G06V 10/70* (2022.01); *G06T 2207/20024* (2013.01); *G06T 2207/20076* (2013.01); *G06T 2207/20081* (2013.01); *G06T 2207/20084* (2013.01)

(58) Field of Classification Search
CPC ..................... G06T 5/002; G06T 5/005; G06T 2207/20024; G06T 2207/20076; G06T 2207/20081; G06T 2207/20084; G06N 20/00; G06N 3/084; G06N 7/005; G06V 10/70; G06B 8/19686

See application file for complete search history.

(56) References Cited

U.S. PATENT DOCUMENTS

| 744,059 A | 11/1903 | Frye |
| 8,867,853 B2 | 10/2014 | Zhang et al. |
| 9,350,914 B1 | 5/2016 | Kaur et al. |

(Continued)

OTHER PUBLICATIONS

Winkler et al., Security and privacy protection in visual sensor networks: a survey, ACM Computing Surveys (CSUR) 47, No. 1: 1-42:2014.

(Continued)

*Primary Examiner* — Sean T Motsinger
(74) *Attorney, Agent, or Firm* — Fasken Martineau Dumoulin LLP; Serge LaPointe (57) ABSTRACT

A method for designing an image filter, the method being executed by a machine learning algorithm (MLA), the method comprising: receiving unfiltered images, a desirable visual task and an undesirable visual task; for each unfiltered image, receiving a first label indicative of whether the desirable visual task is accomplishable and a second label indicative of whether the undesirable visual task is accomplishable; filtering the unfiltered image using a virtual filter model representative of the image filter; using the filtered images, training the MLA to perform the desirable visual task and prevent the undesirable visual task to be performed; using test images, determining a first efficiency for the MLA to perform the desirable task and a second efficiency for the MLA to prevent the undesirable task; adjusting a parameter of the virtual filter model based on the first and second efficiencies; and outputting the adjusted parameter.

20 Claims, 5 Drawing Sheets

(51) Int. Cl.
*G06N 7/00* (2006.01)
*G06V 10/70* (2022.01)

(56) References Cited

U.S. PATENT DOCUMENTS

| | | | |
|---|---|---|---|
| 9,582,681 B2 | 2/2017 | Mishra | |
| 9,953,187 B2 | 4/2018 | Rylski | |
| 10,242,282 B2 | 3/2019 | Loce et al. | |
| 10,297,126 B2 | 5/2019 | Rao | |
| 11,334,773 B2* | 5/2022 | Yadav | G06T 11/00 |
| 2004/0145659 A1* | 7/2004 | Someya | H04N 7/18 |
| | | | 348/207.99 |
| 2017/0147892 A1* | 5/2017 | Ishii | H04N 1/448 |
| 2017/0178287 A1* | 6/2017 | Anderson | G06T 11/00 |
| 2017/0220816 A1 | 8/2017 | Matusek et al. | |
| 2018/0061010 A1* | 3/2018 | Akselrod | H04N 21/4627 |
| 2018/0330591 A1 | 11/2018 | Tilkin | |
| 2018/0341248 A1* | 11/2018 | Mehr | B22F 10/00 |
| 2019/0034716 A1 | 1/2019 | Kamarol et al. | |
| 2019/0068895 A1* | 2/2019 | Hutz | G06K 9/6274 |
| 2019/0108398 A1* | 4/2019 | Haghighat | G06V 20/41 |
| 2019/0279344 A1* | 9/2019 | Duggal | G06F 21/84 |
| 2020/0051241 A1* | 2/2020 | Clark | G06T 7/11 |
| 2020/0160680 A1* | 5/2020 | Edwards | G06V 20/52 |
| 2021/0406589 A1* | 12/2021 | Yadav | G06T 7/11 |
| 2022/0067884 A1* | 3/2022 | Beaudoin | G06N 7/005 |
| 2022/0187847 A1* | 6/2022 | Celia | G05B 19/4155 |

OTHER PUBLICATIONS

Padilla-López et al., Visual privacy protection methods: a survey Expert Systems with Applications 42, No. 9: 4177-4195:2015.

Schiff et al., Respectful cameras: Detecting visual markers in real-time to address privacy concerns Protecting Privacy in Video Surveillance, pp. 65-89 :2009.

* cited by examiner

METHOD AND SYSTEM FOR DESIGNING AN OPTICAL FILTER

TECHNICAL FIELD

The present invention relates to the field of artificial intelligence, and more particularly to machine learning methods and systems for designing an optical filter.

BACKGROUND

Nowadays, data privacy is at the center of ethical discussions and considerations. Existing Machine Learning (ML) models can track a person in a public space. However, if an environment is blurred to preserve privacy of collected data, these existing ML models can poorly track movements of a person and identify the person for security measures or if the person eventually accepts to be willingly identified. One solution consists in using an optical filter which will allow an ML model to perform a first visual task such as tracking a person in a public space while preventing a second visual task such as identifying the tracked person.

Therefore, there is a need for a method and system for designing such an optical filter.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

According to a first broad aspect, there is provided a method for designing an image filter, the method being executed by a processor, the processor having access to a machine learning algorithm (MLA), the method comprising: receiving at least one unfiltered image, a desirable visual task and an undesirable visual task being accomplishable from the at least one unfiltered image; for each one of the at least one unfiltered image, receiving a first label indicative of whether the desirable visual task is accomplishable and a second label indicative of whether the undesirable visual task is accomplishable; filtering the at least one unfiltered image using a virtual filter model representative of the image filter, thereby obtaining at least one filtered image; using the at least one filtered image, training the MLA to perform the desirable visual task and prevent the undesirable visual task to be performed; using a set of test images each having at least one of the first label and second label assigned thereto, determining a first efficiency for the MLA to perform the desirable task and a second efficiency for the MLA to prevent the undesirable task; adjusting a value of at least one lens parameter of the virtual filter model based on the first and second efficiencies; and outputting the value the at least one lens parameter.

In one embodiment, the training the MLA is performed further using at least one of the at least one filtered image.

In one embodiment, the set of test images comprises at least one of the unfiltered images.

In one embodiment, the step of adjusting a value of at least one lens parameter further comprises: determining a third efficiency for the MLA to perform the undesirable visual task; adjusting at least one MLA parameter of the MLA based on the first and third efficiencies; and outputting the trained MLA.

In one embodiment, the method further comprises, when the at least one unfiltered image comprises a set of unfiltered images, dividing the set of unfiltered images into a plurality of batches of unfiltered images, wherein said filtering the unfiltered images, said training the MLA, said determining the first and second efficiencies and said adjusting the value of the at least one lens parameter are performed successively for each one of the plurality of batches of unfiltered images.

In one embodiment, the step of filtering the at least one unfiltered image comprises blurring the at least one unfiltered image.

In one embodiment, the image filter is a lens and the virtual filter model is a virtual lens model.

In one embodiment, the step of filtering the at least one unfiltered image comprises one of transforming the at least one unfiltered image in a colorspace and adding frames together.

In one embodiment, the virtual filter model is differentiable.

In one embodiment, the MLA comprises one of a classification machine learning algorithm and a regression machine learning algorithm.

According to another broad aspect, there is provided a system for designing an image filter, the system comprising: a processor; and a non-transitory storage medium operatively connected to the processor, the non-transitory storage medium comprising computer readable instructions; the processor having access to a machine learning algorithm (MLA), the processor, upon executing the computer readable instructions, being configured for: receiving at least one unfiltered image, a desirable visual task and an undesirable visual task being accomplishable from the at least one unfiltered image; for each one of the at least one unfiltered image, receiving a first label indicative of whether the desirable visual task is accomplishable and a second label indicative of whether the undesirable visual task is accomplishable; filtering the at least one unfiltered image using a virtual filter model representative of the image filter, thereby obtaining at least one filtered image; using the at least one filtered image, training the MLA to perform the desirable visual task and prevent the undesirable visual task to be performed; using a set of test images each having at least one of the first label and second label assigned thereto, determining a first efficiency for the MLA to perform the desirable task and a second efficiency for the MLA to prevent the undesirable task; adjusting a value of at least one lens parameter of the virtual filter model based on the first and second efficiencies; and outputting the value the at least one lens parameter.

In one embodiment, the processor is configured for training the MLA further using at least one of the at least one filtered image.

In one embodiment, the set of test images comprises at least one of the unfiltered images.

In one embodiment, the processor is further configured for: determining a third efficiency for the MLA to perform the undesirable visual task; adjusting at least one MLA parameter of the MLA based on the first and third efficiencies; and outputting the trained MLA.

In one embodiment, when the at least one unfiltered image comprises a set of unfiltered images, the processor is further configured for dividing the set of unfiltered images into a plurality of batches of unfiltered images, wherein said filtering the unfiltered images, said training the MLA, said determining the first and second efficiencies and said adjusting the value of the at least one lens parameter are performed successively by the processor for each one of the plurality of batches of unfiltered images.

In one embodiment, said filtering the at least one unfiltered image comprises blurring the at least one unfiltered image.

In one embodiment, the image filter is a lens and the virtual filter model is a virtual lens model.

In one embodiment, said filtering the at least one unfiltered image comprises one of transforming the at least one unfiltered image in a colorspace and adding frames together.

In one embodiment, the virtual filter model is differentiable.

In one embodiment, the MLA comprises one of a classification machine learning algorithm and a regression machine learning algorithm.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It will be noted that throughout the appended drawings, like features are identified by like reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
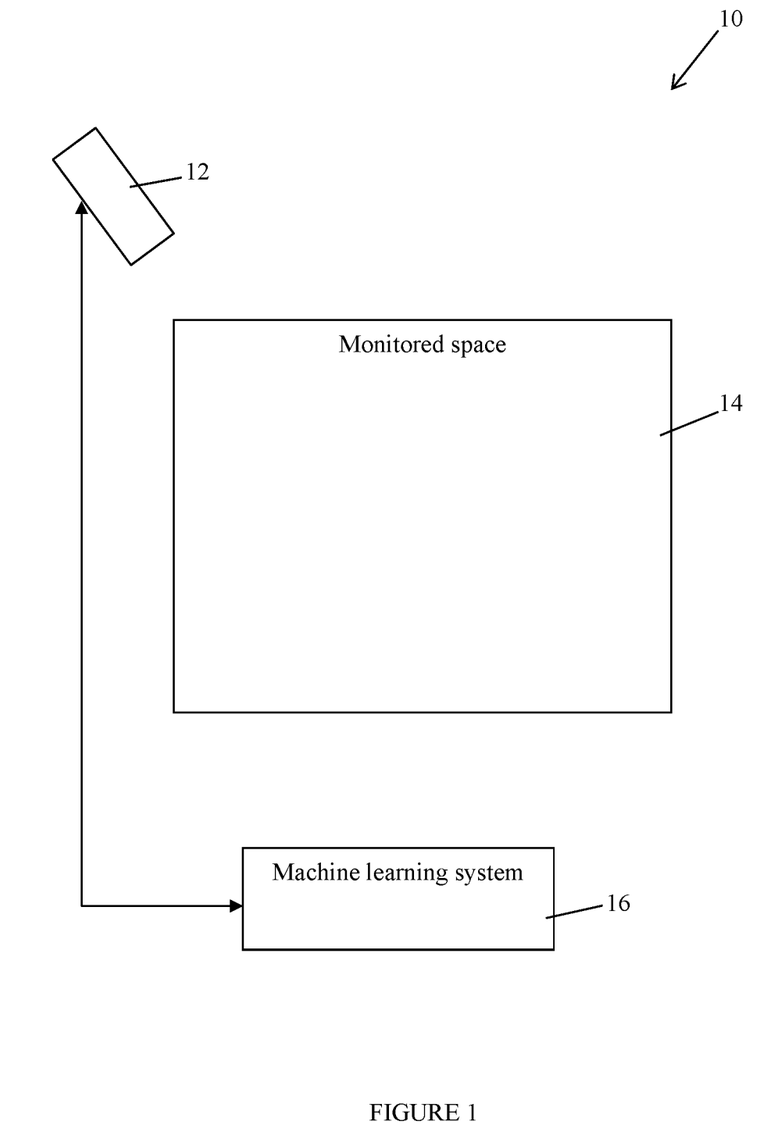
FIG. 1 is a block diagram illustrating a system for designing an optical filter, in accordance with one or more non-limiting embodiments of the present technology.

FIG. 1 illustrates one embodiment of a system 10 for designing an optical filter. The optical filter may be a physical filter adapted to filter light propagating therethrough. Alternatively, the optical filter may be digital. In this case, the optical filter corresponds to an image processing algorithm.

The system 10 comprises an image capturing device 12 configured for capturing images of a monitored area 14 and a machine learning (ML) device 16 configured for performing a first or desired virtual task while preventing a second or undesired visual task to be performed. The system 10 further comprises an optical filter. In an embodiment in which it is a physical filter, the optical filter is contained within the image capturing device which then comprises at least a camera and the physical optical filter. The physical optical filter is positioned in front of the camera (or the lens of the camera). As a result, the images captured by the camera correspond to filtered images of the scene captured by the image capturing device 12. In an embodiment in which the optical filter is digital, the optical filter is embodied as a software module that may be contained in the image capturing device 12, the ML module 16 or in an independent module. In this case, the image capturing device 12 captures unfiltered images of the monitored area 14 and the unfiltered images are subsequently filtered using the filter software module. The filter software module is executed by a processor which may be contained in the image capturing device 12, the ML module 16 or in an independent module.

Once the parameters of the optical filter have been determined (i.e. once the optical filter has been designed), the optical filter allows for the ML device 16 to perform the desired visual task using images taken by the image capturing device 12 while preventing the ML device 16 to perform the undesired task using the same images captured by the image capturing device 12. For example, the desired visual task may consist in determining the presence of a person within an image while the undesired visual task may consist in identifying the person. In this case, the optical filter allows for modifying the captured images sufficiently for preventing an identification of the person contained in the filtered image while still allowing the detection of the presence of a person within the filtered image.

In one embodiment, the optical filter may correspond to an optical lens. In this case, the optical lens may be adapted to blur the images of the monitored area 14 for example and the optical lens may be either a physical lens integrated in the image capturing device 12 or a digital optical lens executed by a processor.

In an embodiment in which it is digital, the optical filter may pixelate the images of the monitored are 14. The optical filter may also be a blurring filter or a motion blur filter that adds different frames together. Another example of a digital optical filter consists in a color-based filter. For example, the color-based filter may transform/project and quantize an image in colorspace, e.g. it may make the image black and white, it may use a reduce palette, etc. In a further example, the digital optical filter may consist in a wavelet-based filter.

It should be understood that any adequate optical filter that may alter at least one characteristic of an image so as to allow a visual task to be performed while preventing a second and different visual task to be performed may be used. It should also be understood that more than one optical filter may be used. For example, an optical lens and a digital optical filter may be used. In another example, two digital filters may be used.

Figure 2:
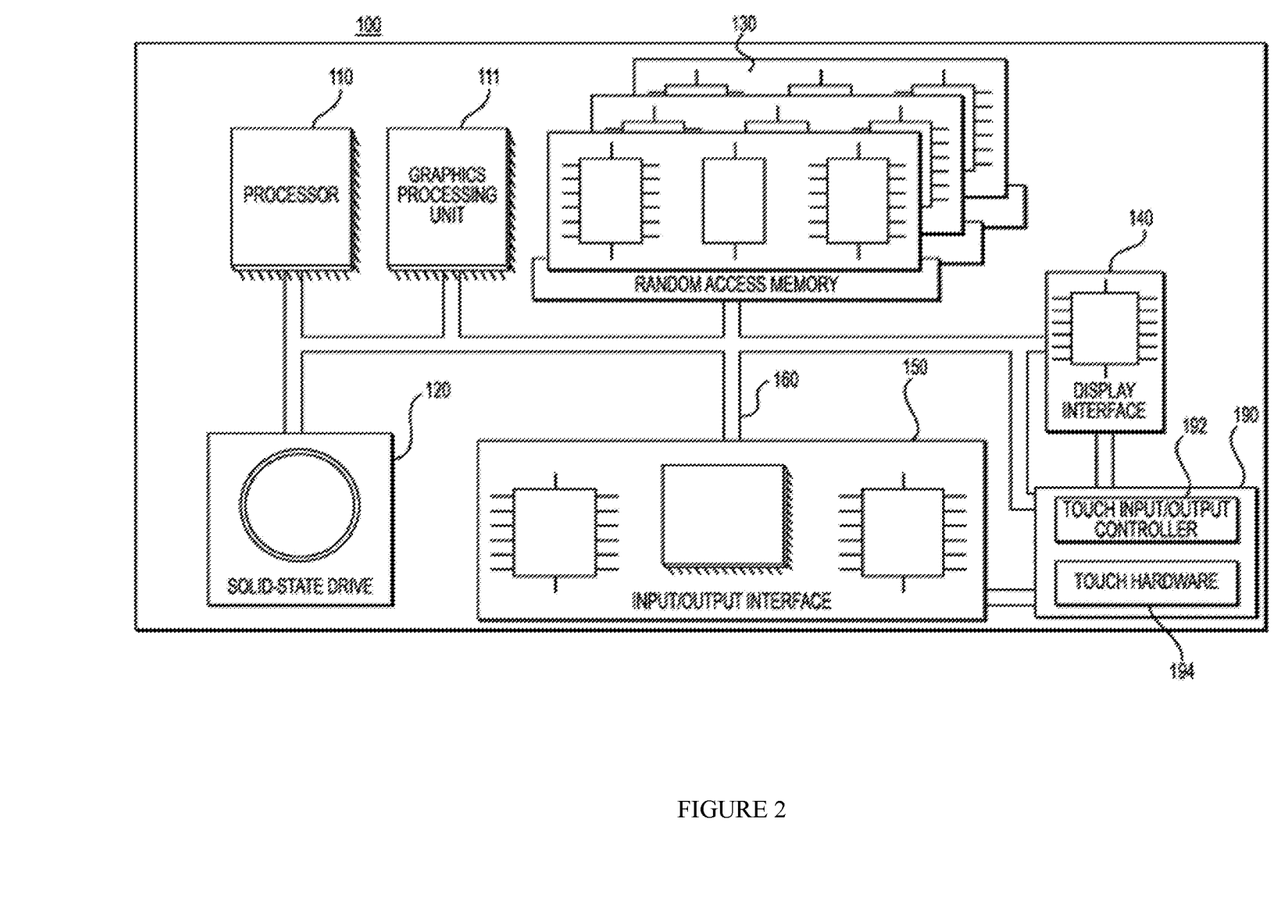
FIG. 2 depicts a schematic diagram of an electronic device in accordance with one or more non-limiting embodiments of the present technology.

Now referring to FIG. 2, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 2, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for training a machine learning algorithm to perform object classification using byte representations thereof. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

Figure 3:
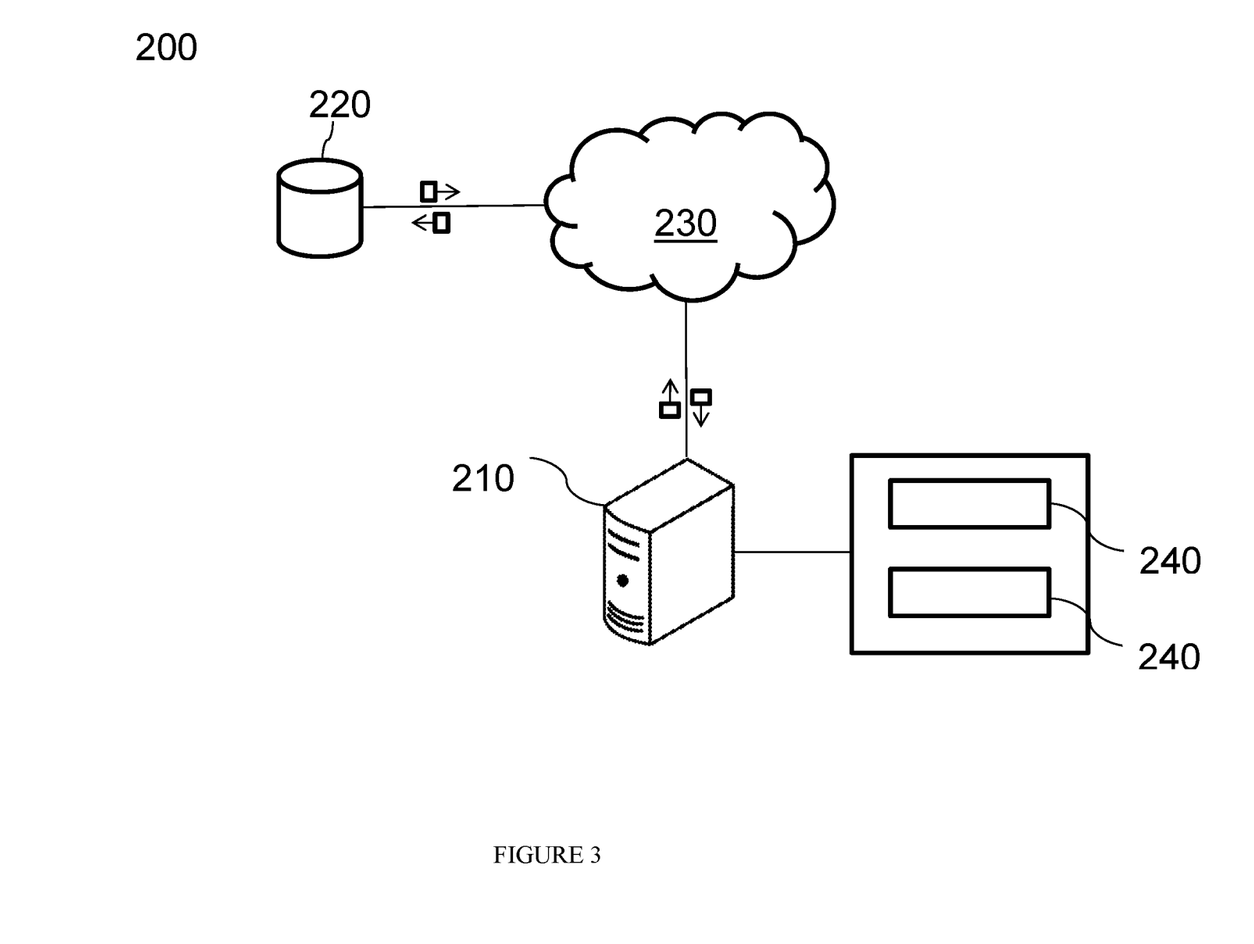
FIG. 3 depicts a schematic diagram of a system in accordance with one or more non-limiting embodiments of the present technology.

Now referring to FIG. 3, there is shown a schematic diagram of a system 200 suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 210, and a database 220, communicatively coupled over a communications network 230 via respective communication links.

The server 210 is configured for: (i) receiving at least one unfiltered image, a desirable visual task and an undesirable visual task being accomplishable by an MLA; (ii) for each unfiltered image, receiving a first label indicative of whether the desirable visual task is accomplishable therefrom and a second label indicative of whether the undesirable visual task is accomplishable therefrom; (iii) filtering the unfiltered image(s) using a virtual filter model representative of the image filter, thereby obtaining at least one filtered image; (iv) using the filtered image(s), training the MLA to perform the desirable visual task and prevent the undesirable visual task to be performed; (v) determining a first efficiency for the MLA to perform the desirable task and a second efficiency for the MLA to prevent the undesirable task; (vi) adjusting a value of at least one lens parameter of the virtual filter model based on the first and second efficiencies; and (vii) outputting the value the at least one lens parameter.

How the server 210 is configured to do so will be explained in more detail herein below.

It will be appreciated that the server 210 can be implemented as a conventional computer server and may comprise at least some of the features of the electronic device 100 shown in FIG. 2. In a non-limiting example of one or more embodiments of the present technology, the server 210 is implemented as a server running an operating system (OS). Needless to say that the server 210 may be implemented in any suitable hardware and/or software and/or firmware or a combination thereof. In the disclosed non-limiting embodiment of present technology, the server 210 is a single server. In one or more alternative non-limiting embodiments of the present technology, the functionality of the server 210 may be distributed and may be implemented via multiple servers (not shown).

The implementation of the server 210 is well known to the person skilled in the art. However, the server 210 comprises a communication interface (not shown) configured to communicate with various entities (such as the database 220, for example and other devices potentially coupled to the communication network 240) via the network. The server 210 further comprises at least one computer processor (e.g., the processor 110 of the electronic device 100) operationally connected with the communication interface and structured and configured to execute various processes to be described herein.

The server 210 has access to one or more machine learning algorithms (MLAs), which will be referred to as the MLA 240.

The MLA 240 is configured for inter alia: (i) receiving images; and (ii) performing a visual task from the received images.

To achieve that objective, the MLA 240 undergoes a training procedure, which will be explained in more detail herein below.

In one or more embodiments, during training of the MLA 240, the MLA 240 is trained to perform a first visual task and not to perform a second and different visual task using a same set of training images.

In one or more embodiments, the server 210 may execute the MLA 240. In one or more alternative embodiments, the MLA 240 may be executed by another server (not depicted), and the server 210 may access the MLA 240 for training or for use by connecting to the server (not shown) via an API (not depicted), and specify parameters the MLA 240, transmit data to and/or receive data from the MLA 240, without directly executing the MLA 240.

As a non-limiting example, one or more MLAs of the set of MLAs 240 may be hosted on a cloud service providing a machine learning API.

A database 220 is communicatively coupled to the server 210 via the communications network 230 but, in one or more alternative implementations, the database 220 may be communicatively coupled to the server 210 without departing from the teachings of the present technology. Although the database 220 is illustrated schematically herein as a single entity, it will be appreciated that the database 220 may be configured in a distributed manner, for example, the database 220 may have different components, each component being configured for a particular kind of retrieval therefrom or storage therein.

The database 220 may be a structured collection of data, irrespective of its particular structure or the computer hardware on which data is stored, implemented or otherwise rendered available for use. The database 220 may reside on the same hardware as a process that stores or makes use of the information stored in the database 220 or it may reside on separate hardware, such as on the server 210. The database 220 may receive data from the server 210 for storage thereof and may provide stored data to the server 210 for use thereof.

In one or more embodiments of the present technology, the database 220 is configured to inter alia: (i) store training images; (ii) store a first and a second labels for each training images; (iv) store parameters of one or more MLAs 240; and store one or more parameter for the optical filter model.

In one or more embodiments of the present technology, the communications network 230 is the Internet. In one or more alternative non-limiting embodiments, the communication network 230 may be implemented as any suitable local area network (LAN), wide area network (WAN), a private communication network or the like. It will be appreciated that implementations for the communication network 230 are for illustration purposes only. How a communication link between the server 210, the database 220, and/or another electronic device (not shown) and the communications network 230 is implemented will depend inter alia on how each electronic device is implemented.

Figure 4:
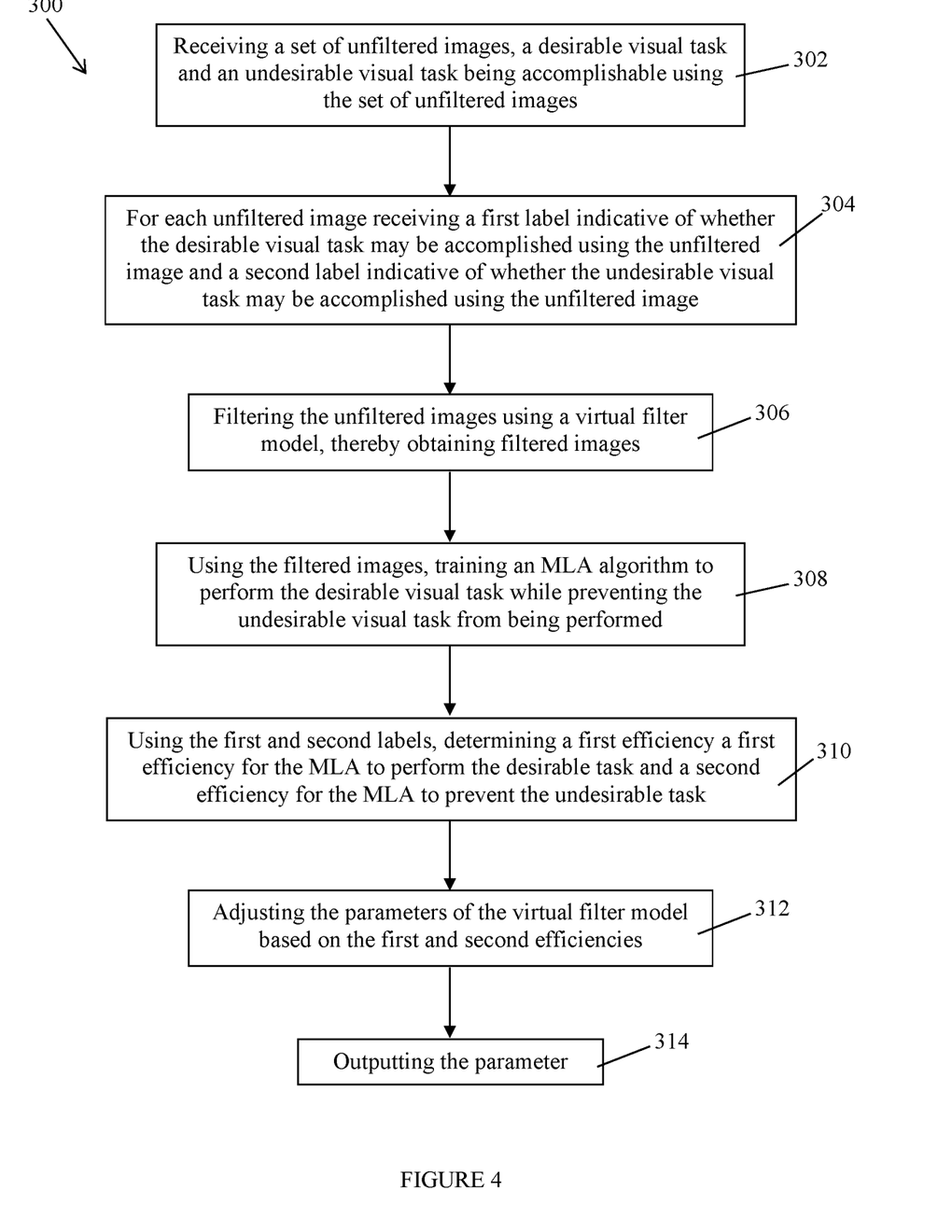
FIG. 4 illustrates a flow chart describing a computer-implemented method for designing an optical filter using an MLA, in accordance with a first embodiment.

FIG. 4 illustrates one embodiment of a computer-implemented method 300 for designing an optical filter in the context of the execution of a first visual task by an MLA while a second and different visual task is prevented from being performed by the MLA. It should be understood that the same MLA must be able to accomplish the first visual task and prevent the second visual task to be performed. It should be understood that the method 300 may be performed by an computer device provided with a processor, a memory and communication means. For example, the method 300 may be executed by the server 210 of the system 200.

At step 302, at least one training or unfiltered image is received. The training image(s) is (are) chosen so as to allow the MLA to perform a first visual task and/or a second visual task. The first visual task corresponds to a desired visual task, i.e. a visual task that the MLA should be able to accomplish, whereas the second visual task corresponds to an undesired visual task, i.e. a visual task that the MLA should not be able to accomplish.

In one embodiment, a single unfiltered image may be received at step 302. For example, a single image may be received in the case of face recognition. In another embodiment, a set of unfiltered images may be received at step 302. For example, in the case of gesture recognition, a set of consecutive images may be received at step 302.

In one embodiment, a visual task may be defined as the extraction of at least one characteristic from an image. A visual task may be a simple task such as "identifying the dominant color in an image" or may be a more complex task such as "predicting if two cars are going to collide given their speed, trajectory, the state of the road, etc.".

For example, a visual task may comprise the identification within an image of a predefined element. The predefined element may comprise a pixel belonging to a body, a body such as the body of a human or the body of an animal, a part of a body, an inanimate object, a shape, a color, etc. A visual task may also correspond to the identification of a facial expression of a subject represented in an image. Other examples of visual task include: object/face recognition, object localization, gesture recognition, visual odometry (i.e. determining the position/orientation/speed of a camera based on an image), character recognition (such as optical character recognition), 3D pose estimation, motion estimation or motion detection, scene/object 3D reconstruction, object/person tracking, or the like.

It should be understood that the first visual task and/or the second visual task may be a combination of at least two visual tasks such as "Detect whether a human is moving, but not an animal".

At step 304, a first and a second training labels are received for each training image received at step 302. The first label associated with a given training image indicates the result of the first visual task on the given training image and the second label associated with a given training image indicates the result of the second visual tasks on the given training image. So, for example, if the first visual task is "emotion identification" and the second visual task is "facial recognition" then, if the training image is a picture of Philippe smiling, the first label would be "smiling" and the second label would be "Philippe".

In an embodiment in which a set of images is received at step 302, a first and second labels may be assigned to each image of the set of received images. In another embodiment, a first and second labels may be assigned to the set of images, so that the same first and second labels apply to each image of the set.

In one embodiment, the labels are generated by a human being who tags each training image by associating a first and second labels to each training image.

At step 306, the training images are filtered using a virtual model representing the optical filter to be designed. The parameters of the virtual model are set to initial values and the goal of the method 300 is to determine an adequate value for the parameters.

In an embodiment in which the optical filter is a physical optical filter such as a physical pens, the virtual model models the operation of the physical filter so that a filtered image digitally filtered using the virtual model be substantially identical to an image filtered using the physical optical filter.

In an embodiment in which the optical filter is a digital optical filter, the virtual model corresponds to the digital filter itself.

Referring back to FIG. 4, the training images are each filtered using the virtual model to obtain a set of filtered images. It should be understood that the first and second labels associated with a training image are also associated with the filtered image resulting from the filtering the training image.

At step 308, using the filtered images generated at step 306, the MLA is trained concurrently to perform the first or desired visual task on the filtered image and not to perform the second or undesired task on the filtered images.

In one embodiment, the MLA used for performing a visual task is based on neural networks trained using an optimization algorithm such as typically stochastic gradient descent or any variant thereof.

It should be understood that the architecture of the neural networks may vary. In one embodiment, the neural networks contain a series of convolutional layers, a series of fully-connecter layers, possibly batch normalization layers, possibly skip connections, pooling layers, residual blocks, softmax layers, attention mechanisms, and/or the like. It should be understood that the number and type of layers may vary as a function of parameters such as the type of visual tasks to be performed.

Once the MLA has been trained, the ability or efficiency for the MLA to perform the desired visual task and the ability or efficiency for the MLA not to perform the undesired visual task (or to prevent the undesirable task to be accomplished) are determined at step 310 using the first and second labels.

In one embodiment, a second set of unfiltered images different from the training images is used for assessing the efficiency of the MLA to perform the first or desired task and not perform the second or undesirable task. The second set of unfiltered images is referred to as the test images hereinafter. As for the first set of unfiltered images used for training the MLA, a first and/or a second labels are assigned to each test image to indicate whether the first and second visual tasks may be performed from the test images. The test images are filtered using the virtual model representing the optical filter and the efficiencies of the MLA are determined based on the filtered test images.

The filtered test images are used as input for the MLA which determines whether the first and second visual tasks may be performed from the test images. The results are then compared to the labels to determine right answers, i.e. whether the MLA was successful in performing the first and second tasks.

In one embodiment, the test images may comprise the training images so that the set of test images corresponds to the set of training images. In another embodiment, each test image may be different from any training image. In a further embodiment, the test images may comprise images from the training images and additional images not contained in the training images.

It should be understood that some test images may only have a single label assigned thereto.

In one embodiment, the efficiency for the MLA to perform the desired visual task is expressed by an accuracy factor A:

$$A = \frac{\text{\# right answers for task 1}}{\text{\# total test images for task 1}}$$

A right answer for the first or desired task is determined when the MLA was successful in performing the first visual task from a given test image having a first label assigned thereto and when the first label associated with the given test image indicates that the desired task is accomplishable from the given test image. The total number of images for the first or desired task corresponds to the total number of test images having a first label assigned thereto and of which the first label indicates that the desired visual task may be accomplished from the training image. The factor A is then determined by dividing the number of right answers for the desired visual task by the total number of test images for the first or desired task.

In one embodiment, the efficiency for the MLA not to perform the undesired visual task is expressed by a privacy factor P:

$$P = 1 - \frac{\text{\# right answers for task 2}}{\text{\# total test images for task 2}}$$

A right answer for the second or undesired task is determined when the MLA was successful in identifying the second visual task from a given test image having a second label assigned thereto and when the second label associated with the given image indicates that the undesired task is accomplishable from the given image. The total number of images for the second or undesired task corresponds to the total number of test images having a second label assigned thereto and of which the second label indicates that the undesired visual task may be accomplished from the training image. The factor P is then determined by dividing the number of right answers for the undesired visual task by the total number of images for the second or undesired task to obtain a quotient and subtracting the quotient from 1.

The determined first and second efficiencies are then each compared to a respective threshold. A first threshold is associated with the desired visual task and represents the minimal efficiency for the MLA to accomplish the desired visual task. A second threshold is associated with the undesired task and represents the minimal inefficiency for the MLA to accomplish the undesired visual task. The first efficiency, i.e. the determined efficiency for the MLA to perform the desired visual task, should be equal to or greater than its corresponding threshold while the second efficiency, i.e. the determined efficiency for the MLA to be unable to perform the undesired visual task, should be equal to or greater than its corresponding threshold.

If the first efficiency is equal to or greater than the first threshold and the second efficiency is equal to or greater than the second threshold, then the modeled optical filter is considered to be adequate for allowing the MLA to perform the desired visual task while preventing the MLA to accomplish the undesired task, and the method 300 stops.

If the first efficiency is less than the first threshold or the second efficiency is less than the second threshold, the virtual filter model has to be modified as described at step 312.

At step 312, at least one parameter of the virtual filter model is adjusted based on the determined first and second efficiencies.

For example, if the optical filter is a lens adequate for blurring an image, the blur level of the lens is adjusted as a function of the first and second efficiencies.

In an example in which the optical filter is digital, the size and/or shape of pixels could be changed for a pixelating filter. The size and/or shape of the blur kernel could be adjusted for a blurring filter. For a color space transformation or projection or quantization filter, the transformation matrix, the projection matrix or the quantization bins could be changed. For a wavelet filter, the parameters of the filter could be changed. In each of these cases, a number of optimization techniques may be used. Examples of such optimization techniques include: Bayesian optimization, coordinate descent or adaptive coordinate descent, genetic algorithms, simulated annealing, etc. In one embodiment, heuristics may also be used to select changes in parameters that increase the amount of information if the desirable tasks fails or that reduce the amount of information if the undesirable tasks succeeds.

In an embodiment in which the first and second efficiencies are represented by the accuracy factor A and the privacy factor P, the parameter(s) of the model is(are) adjusted based on the accuracy factor A and the privacy factor P.

For example, if the optical filter is a lens adequate for blurring an image, the blur level of the lens is adjusted as a function of the accuracy factor A and the privacy factor P. If the privacy factor is below its threshold, the parameters of the optical lens are adjusted to make the lens more information-destroying. If the accuracy factor is below its threshold, the parameters of the optical lens are adjusted to make the lens more information-preserving.

In one embodiment, a cost function C1 is calculated using the accuracy and privacy factors A and P and the parameters of the model are adjusted based on the cost function. For example, the cost function C1 may be a weighted summation of the accuracy and privacy factors A and P:

$$C1 = \alpha \cdot A + \beta \cdot P$$

where $\alpha$ and $\beta$ are predefined coefficients.

In one embodiment, the coefficients $\alpha$ and $\beta$ are comprised between 0 and 1. It should be understood that the cost function C1 is to be maximized while maintaining its value below a predefined threshold.

Once the new value for the parameter(s) has been determined, the new parameter value is outputted at step 314. In one embodiment, the parameters are stored in memory such as in the database 210. In another embodiment, the parameters for the virtual model are stored locally such as on the server 210.

In one embodiment, the step 308 of training the MLA is performed further using at least some of the training or unfiltered images in addition to the filtered images generated at step 306. In one embodiment, the use of the unfiltered images for training the MLS may reduce the training time for training the MLA.

In one embodiment, the virtual model is differentiable so as to allow for back propagation and adjustment of the parameters of the virtual model.

It should be understood that the method 300 may be repeated until the determined values for the parameters for the virtual model allow for the first efficiency for the desired task to at least equal to its associated threshold and the second efficiency associated with the undesired task to be below its associated threshold.

Figure 5:
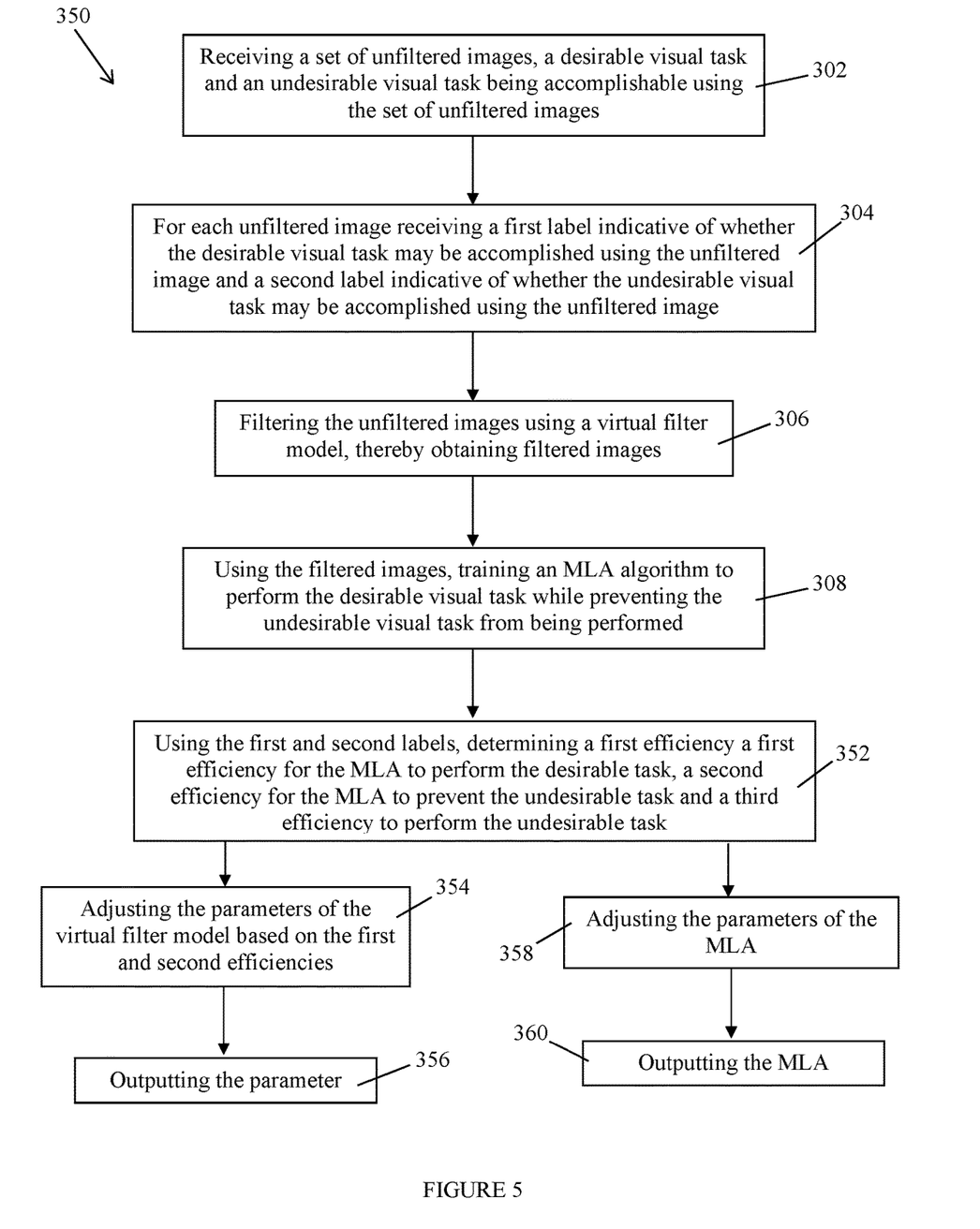
FIG. 5 illustrates a flow chart describing a computer-implemented method for designing an optical filter using an MLA, in accordance with a first embodiment.

FIG. 4 illustrates one embodiment of a further computer-implemented method 350 for designing an optical filter using an MLA in the context where the MLA should accomplish a desirable visual task while preventing a second visual task to be accomplished.

The first four steps of the method 350 are identical to the first four steps 302-308 of the method 300.

At step 302, a set of training or unfiltered images is received. The training images are chosen so as to allow the MLA to perform both a first and a second visual tasks.

At step 304, a first and a second label are received for each training image received at step 302. The first label associated with a given training image indicates whether or not the first visual task may be accomplished from the given training image and the second label associated with a given training image indicates whether or not the second visual task may be accomplished from the given training image.

At step 306, the training images are filtered using a virtual model representing the optical filter to be designed. As stated above, the In an embodiment in which the optical filter is a physical optical filter such as a physical pens, the virtual model models the operation of the physical filter so that a filtered image digitally filtered using the virtual model be substantially identical to an image filtered using the physical optical filter.

In an embodiment in which the optical filter is a digital optical filter, the virtual model corresponds to the digital filter itself.

Referring back to FIG. 4, the training images are each filtered using the virtual model to obtain a set of filtered images. It should be understood that the first and second labels associated with a training image are also associated with the filtered image resulting from the filtering the training image.

At step 308, using the filtered images generated at step 306, the MLA is trained concurrently to perform the first or desired visual task on the filtered image and not to perform the second or undesired task on the filtered images.

Once the MLA has been trained, abilities or efficiencies for the MLA are calculated at step 352 using a set of test images, as described above. In addition to the above described first efficiency for the MLA to perform the desired visual task and second efficiency for the MLA not to perform the undesired visual task, a third efficiency is calculated at step 352, i.e. the efficiency for the MLA to perform the undesired visual task.

In one embodiment, the third efficiency is expressed by a third factor T:

$$Y = \frac{\text{\# right answers for task 2}}{\text{\# total test images for task 2}}$$

As described above, a right answer for the second or undesired task is determined when the MLA was successful in identifying the second visual task from a given test image having a second label assigned thereto and when the second label associated with the given test image indicates that the undesired task is accomplishable from the given image. The total number of images for the second or undesired task corresponds to the total number of test images having a second label assigned thereto and of which the second label indicates that the undesired visual task may be accomplished from the training image. The factor T is then determined by dividing the number of right answers for the undesired visual task by the total number of images for the second or undesired task.

As described above, the determined first and second efficiencies are then each compared to a respective threshold for adjusting the parameters of the virtual model of the optical filter. Similarly, a third threshold is associated with the third efficiency which measures the efficiency for the MLA to accomplish the undesired visual task. The third efficiency, i.e. the determined efficiency for the MLA to perform the undesired visual task, should be equal to or greater than its corresponding threshold.

If the first efficiency is equal to or greater than the first threshold, the second efficiency is equal to or greater than the second threshold and the third efficiency is equal to or greater than the third threshold, then the modeled optical filter is considered to be adequate for allowing the MLA to perform the desired visual task while preventing the MLA to accomplish the undesired task, and the method 350 stops.

If at least one of the first, second and third efficiencies is less than its corresponding threshold, the virtual filter model has to be modified as described at step 354-360.

At step 354, at least one parameter of the virtual filter model is adjusted based on the determined first and second efficiencies. For example, the above-described accuracy and privacy factors A and P may be used. In this case, the parameters of the virtual filter model are adjusted based on the accuracy and privacy factors A and P.

In one embodiment, the above-described cost function C1 is used for adjusting the parameters of the virtual model, i.e. calculating new values for the parameters based on the cost function C1.

Once the new value for the parameter(s) has been determined, the new parameter values are outputted at step 356.

At step 358, the parameters of the MLA are adjusted based on the first and third efficiencies for the MLA determined at step 52, i.e. based on the first efficiency for the MLA to perform the desired visual task and the third efficiency for the MLA to accomplish the undesired visual task.

In one embodiment, a second cost function C2 is calculated based on the first and third efficiencies and the parameters of the MLA are adjusted based on the second cost function C2. The target of the method 350 is to maximize the second cost function C2 for the MLA to be performant at performing both the desired and undesired visual tasks. In this case, the inability of the MLA in accomplishing the undesired visual task is provided only by the design of the optical filter.

In one embodiment, the second cost function C2 is calculated based on the above-described accuracy A for the MLA to accomplish the desired visual task and the above-described accuracy P for the MLA to accomplish the undesired visual task. IN one embodiment, the second cost function C2 may be expressed as a weighted summation of the two accuracy factors A and T:

$$C2 = \gamma \cdot A + \delta \cdot T$$

where γ and δ are predefined coefficients.

Once the parameters of the MLA have been updated based on the first and third efficiencies for the MLA such as based on the second cost function C2, the MLA is outputted at step 360. For example, the trained MLA may be stored in memory.

In one embodiment of the method 350, the training images are divided into a plurality of batches and the steps 306, 308 and 352-360 are performed iteratively for each batch of training images. In one embodiment, for each batch, the training images belonging to the batch may be randomly selected from the training images received at step 302.

In one embodiment, the steps 354 and 358 are performed concurrently. In another embodiment, the steps 354 and 358 are performed successively.

In one embodiment, the step 308 of training the MLA is performed further using at least some of the training or unfiltered images in addition to the filtered images generated at step 306. In one embodiment, the use of the unfiltered images for training the MLS may reduce the training time for training the MLA.

In one embodiment, the virtual model is differentiable so as to allow for back propagation and adjustment of the parameters of the virtual model.

It should be understood that the method 350 may be repeated until the determined values for the parameters for the virtual model allow for the first efficiency for the desired task to at least equal to its associated threshold and the second efficiency associated with the undesired task to be below its associated threshold. For each iteration, the training images may be identical, i.e. the same training images are used for each iteration of the method 350. Alternatively, at least two iterations of the method 350 may use different training images.

Similarly, for each iteration, the same test images may be used. Alternatively, different test images may be used for each iteration.

The embodiments of the invention described above are intended to be exemplary only. The scope of the invention is therefore intended to be limited solely by the scope of the appended claims.

We claim:

1. A method for designing an image filter, the method being executed by a processor, the processor having access to a machine learning algorithm (MLA), the method comprising:
    receiving at least one unfiltered image, a desirable visual task and an undesirable visual task being accomplishable from the at least one unfiltered image;
    for each one of the at least one unfiltered image, receiving a first label indicative of whether the desirable visual task is accomplishable and a second label indicative of whether the undesirable visual task is accomplishable;
    filtering the at least one unfiltered image using a virtual filter model representative of the image filter, thereby obtaining at least one filtered image;
    using the at least one filtered image, training the MLA to perform the desirable visual task and prevent the undesirable visual task to be performed;
    using a set of test images each having at least one of the first label and second label assigned thereto, determining a first efficiency for the MLA to perform the desirable task and a second efficiency for the MLA to prevent the undesirable task;
    adjusting a value of at least one lens parameter of the virtual filter model based on the first and second efficiencies; and
    outputting the value the at least one lens parameter.

2. The method of claim 1, wherein said training the MLA is performed further using at least one of the at least one filtered image.

3. The method of claim 1, wherein the set of test images comprises at least one of the unfiltered images.

4. The method of claim 1, wherein said adjusting a value of at least one lens parameter further comprising:
- determining a third efficiency for the MLA to perform the undesirable visual task;
- adjusting at least one MLA parameter of the MLA based on the first and third efficiencies; and
- outputting the trained MLA.

5. The method of claim 2, further comprising, when the at least one unfiltered image comprises a set of unfiltered images, dividing the set of unfiltered images into a plurality of batches of unfiltered images, wherein said filtering the unfiltered images, said training the MLA, said determining the first and second efficiencies and said adjusting the value of the at least one lens parameter are performed successively for each one of the plurality of batches of unfiltered images.

6. The method of claim 1, wherein said filtering the at least one unfiltered image comprises blurring the at least one unfiltered image.

7. The method of claim 1, wherein the image filter is a lens and the virtual filter model is a virtual lens model.

8. The method of claim 1, wherein said filtering the at least one unfiltered image comprises one of transforming the at least one unfiltered image in a colorspace and adding frames together.

9. The method of claim 1, wherein the virtual filter model is differentiable.

10. The method of claim 1, wherein the MLA comprises one of a classification machine learning algorithm and a regression machine learning algorithm.

11. A system for designing an image filter, the system comprising:
- a processor; and
- a non-transitory storage medium operatively connected to the processor, the non-transitory storage medium comprising computer readable instructions;
- the processor having access to a machine learning algorithm (MLA), the processor, upon executing the computer readable instructions, being configured for:
  - receiving at least one unfiltered image, a desirable visual task and an undesirable visual task being accomplishable from the at least one unfiltered image;
  - for each one of the at least one unfiltered image, receiving a first label indicative of whether the desirable visual task is accomplishable and a second label indicative of whether the undesirable visual task is accomplishable;
  - filtering the at least one unfiltered image using a virtual filter model representative of the image filter, thereby obtaining at least one filtered image;
  - using the at least one filtered image, training the MLA to perform the desirable visual task and prevent the undesirable visual task to be performed;
  - using a set of test images each having at least one of the first label and second label assigned thereto, determining a first efficiency for the MLA to perform the desirable task and a second efficiency for the MLA to prevent the undesirable task;
  - adjusting a value of at least one lens parameter of the virtual filter model based on the first and second efficiencies; and
  - outputting the value the at least one lens parameter.

12. The system of claim 11, wherein the processor is configured for training the MLA further using at least one of the at least one filtered image.

13. The system of claim 11, wherein the set of test images comprises at least one of the unfiltered images.

14. The system of claim 11, wherein the processor is further configured for:
- determining a third efficiency for the MLA to perform the undesirable visual task;
- adjusting at least one MLA parameter of the MLA based on the first and third efficiencies; and
- outputting the trained MLA.

15. The system of claim 12, when the at least one unfiltered image comprises a set of unfiltered images, the processor is further configured for dividing the set of unfiltered images into a plurality of batches of unfiltered images, wherein said filtering the unfiltered images, said training the MLA, said determining the first and second efficiencies and said adjusting the value of the at least one lens parameter are performed successively by the processor for each one of the plurality of batches of unfiltered images.

16. The system of claim 11, wherein said filtering the at least one unfiltered image comprises blurring the at least one unfiltered image.

17. The system of claim 11, wherein the image filter is a lens and the virtual filter model is a virtual lens model.

18. The system of claim 11, wherein said filtering the at least one unfiltered image comprises one of transforming the at least one unfiltered image in a colorspace and adding frames together.

19. The system of claim 11, wherein the virtual filter model is differentiable.

20. The system of claim 11, wherein the MLA comprises one of a classification machine learning algorithm and a regression machine learning algorithm.

* * * * *